(12) United States Patent
Chow et al.

(10) Patent No.: US 9,090,333 B2
(45) Date of Patent: Jul. 28, 2015

(54) SPLITTER PLATE FOR AIRCRAFT NOISE REDUCTION APPARATUS

(71) Applicant: AIRBUS OPERATIONS LIMITED, Bristol (GB)

(72) Inventors: Leung Choi Chow, Bristol (GB); Matthew Spiteri, Southampton (GB); Xin Zhang, Southampton (GB); David Angland, Southampton (GB); Michael Goodyer, Southampton (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/680,598

(22) Filed: Nov. 19, 2012

(65) Prior Publication Data

US 2013/0193268 A1 Aug. 1, 2013

Related U.S. Application Data

(62) Division of application No. 12/734,334, filed as application No. PCT/GB2008/050983 on Oct. 23, 2008, now abandoned.

(30) Foreign Application Priority Data

Oct. 26, 2007 (GB) .................................. 0720973.7

(51) Int. Cl.
*B64C 25/00* (2006.01)
*B64C 1/40* (2006.01)
*B64C 21/00* (2006.01)
(Continued)

(52) U.S. Cl.
CPC . *B64C 1/40* (2013.01); *B64C 21/00* (2013.01); *B64C 23/00* (2013.01); *B64C 25/001* (2013.01); *B64C 25/16* (2013.01);
(Continued)

(58) Field of Classification Search
USPC .. 244/1 N, 100 R, 102 R, 102 A, 103 R, 130, 244/198, 202, 207
See application file for complete search history.

(56) References Cited

U.S. PATENT DOCUMENTS 2,129,824 A    9/1938  De Seversky
2,180,462 A *  11/1939 De Seversky ............. 244/102 R
(Continued)

FOREIGN PATENT DOCUMENTS

DE    100 52 022    5/2002
EP    0 375 586     6/1990
(Continued)

OTHER PUBLICATIONS

Joslin, Ronald D. Miller, Daniel N.. (2009). Fundamentals and Applications of Modern Flow Control. American Institute of Aeronautics and Astronautics. Online version available at: http://app.knovel.com/hotlink/toc/id:kpFAMFC00B/fundamentals-applications/fundamentals-applications.*

(Continued)

*Primary Examiner* — Tien Dinh
*Assistant Examiner* — Michael A Fabula
(74) *Attorney, Agent, or Firm* — Nixon & Vanderhye P.C.

(57) ABSTRACT

An aircraft noise-reduction apparatus comprise a flow-facing element (1) and a flow control device (2) positioned downstream of the flow-facing element (1). The flow control device (2) is arranged, in use, to reduce noise induced by unsteady flow downstream of the flow-facing element (1).

12 Claims, 5 Drawing Sheets

(51) Int. Cl.
    B64C 23/00    (2006.01)
    B64C 25/16    (2006.01)
(52) U.S. Cl.
    CPC ...... *B64C 2025/003* (2013.01); *B64C 2230/14* (2013.01); *Y02T 50/166* (2013.01)

(56) References Cited

U.S. PATENT DOCUMENTS

| | | | | |
|---|---|---|---|---|
| 2,747,817 | A | * | 5/1956 | Saulnier ........................ 244/50 |
| 2,869,805 | A | * | 1/1959 | Marshall ........................ 244/87 |
| 3,130,942 | A | * | 4/1964 | Fradenburg ................ 244/17.11 |
| 3,360,221 | A | * | 12/1967 | Heskestad ..................... 244/208 |
| 3,854,678 | A | * | 12/1974 | Geres ........................... 244/3.16 |
| 4,027,836 | A | | 6/1977 | Seibel |
| 5,069,402 | A | * | 12/1991 | Wortman ....................... 244/130 |
| 5,265,830 | A | * | 11/1993 | Allen ............................. 244/213 |
| 6,186,445 | B1 | * | 2/2001 | Batcho .......................... 244/130 |
| 7,150,434 | B1 | * | 12/2006 | Bandyopadhyay ........... 244/130 |
| 7,651,053 | B2 | * | 1/2010 | Fort ............................. 244/129.4 |
| 7,784,737 | B2 | | 8/2010 | Lee et al. |
| 2004/0104301 | A1 | * | 6/2004 | Wickerhoff et al. ............ 244/10 |
| 2006/0014588 | A1 | | 1/2006 | Page |
| 2006/0032981 | A1 | * | 2/2006 | Fort ............................. 244/129.4 |
| 2006/0060707 | A1 | | 3/2006 | Chow et al. |
| 2007/0063102 | A1 | | 3/2007 | Lee et al. |
| 2007/0108344 | A1 | * | 5/2007 | Wood ......................... 244/102 R |
| 2008/0067283 | A1 | | 3/2008 | Thomas |

FOREIGN PATENT DOCUMENTS

| | | |
|---|---|---|
| EP | 1 382 526 | 1/2004 |
| FR | 1 323 294 | 4/1963 |
| GB | 365 300 | 1/1932 |
| JP | 07 117794 | 5/1995 |
| WO | WO 01/04003 | 1/2001 |
| WO | WO 2004/089742 | 10/2004 |
| WO | WO 2004/089744 | 10/2004 |
| WO | WO 2005/096721 | 10/2005 |
| WO | WO 2007/106863 | 9/2007 |
| WO | WO 2009/053745 | 4/2009 |

OTHER PUBLICATIONS

Gunston, Bill. (2009). Cambridge Aerospace Dictionary (2nd Edition). Cambridge University Press. Online version available at: http://app.knovel.com/hotlink/toc/id:kpCADE0003/cambridge-aerospace-dictionary/cambridge-aerospace-dictionary.*
Y. Nakamura, "Vortex Shedding From Bluff Bodies With Splitter Plates" Journal of Fluids and Structures, 1996, 10, pp. 147-158.
I. Kunihiko et al, "Effect of Splitter Plate on Generation Mechanism of Aeolian Tones" Transactions of the Japan Society of Mechanical Engineers 2000, vol. 66, No. 649, pp. 2377-2383.
Casalino et al, "Aircraft Noise Reduction Technologies: A Bibliographic Review" Aerospace Science and Technology, 12, 2008, pp. 1-17.
Search Report for GB0720973.7 dated Feb. 16, 2008.
International Search Report for PCT/GB2008/050983, mailed Mar. 12, 2009.
Written Opinion for PCT/GB2008/050983, mailed Mar. 12, 2009.
U.S. Appl. No. 12/998,115, filed Mar. 18, 2011, Chow et al.
M. Spiteri et al, "The Use of a Fairing and Split Plate for Bluff Body Noise Control" AIAA, pp. 1-12.
S. Oerlemans et al, "Reduction of Landing Gear Noise Using an Air Curtain" 15th AIAA/CEAS Aeroacoustics Conference, May 2009, pp. 1-25.
International Search Report for PCT/GB2009/051268 dated Nov. 12, 2009, 4 pages.
Written Opinion for PCT/GB2009/051268 dated Nov. 12, 2009, 9 pages.

* cited by examiner

SPLITTER PLATE FOR AIRCRAFT NOISE REDUCTION APPARATUS

This application is a Division of application Ser. No. 12/734,334, filed Apr. 26, 2010, which is the US national phase of international application PCT/GB2008/050983, filed in English on 23 Oct. 2008, which designated the US. PCT/GB2008/050983 claims priority to GB Application No. 0720973.7 filed 26 Oct. 2007. The entire contents of these applications are incorporated herein by reference.

FIELD OF THE INVENTION

The present invention relates to noise-reduction apparatus for use on an aircraft. More particularly, but not exclusively, the invention relates to a method of reducing noise generated by the interaction of the landing gear or parts thereof and the air flowing past it during flight, take-off and/or landing.

BACKGROUND OF THE INVENTION

Flow around bodies generates noise, which is detrimental in particular aerodynamic applications for example where low noise emissions are a design requirement. One such application where the level of noise emissions is important is in the design of commercial aircraft. Over the past decades engine noise has been significantly reduced, for example by the introduction of high-bypass ratio turbofan engines. However, maintaining the minimum engine ground clearance with such high-bypass ratio turbo fan engines results in longer landing gear. Thus, landing gear on commercial aircraft have been identified as major noise contributors during approach and landing. The design of a landing gear is primarily based on its structural and dynamic function. This complex geometric design gives rise to unsteady flow which leads to unwanted noise generation.

Fairings have been proposed as a means of reducing landing gear noise. For example, a noise reduction fairing for an aircraft landing gear is disclosed in WO 01/04003A1. Such noise reduction fairings at least partially shield downstream components such as struts stays and actuators from high-speed flow.

Embodiments of the present invention seek to provide improved or alternate noise-reduction apparatus for aircraft. Some embodiments may also reduce the noise generated by noise reduction fairings themselves.

SUMMARY OF THE INVENTION

According to a first aspect of the invention there is provided an aircraft noise-reduction apparatus comprising a flow-facing aircraft structural element and a flow control device positioned downstream of the structural element and arranged, in use, to reduce noise induced by unsteady flow downstream of the structural element, wherein the flow control device comprises a pneumatic splitter plate. In other words, a jet of air may be blown downstream from the flow-facing element to create an equivalent flow control effect to that of a rigid splitter plate.

The applicants have found that unsteady flow, around and in the wake of a flow-facing element can cause a significant contribution to creation of broadband noise. In particular, it has been noted that unsteady velocity fluctuations and/or net lift forces generated in the flow may be a key noise generating mechanism. As such embodiments of the invention utilise a splitter plate downstream of the flow-facing element to reduce broadband noise.

In particular, the flow control device may be arranged to reduce the flow fluctuations due to relatively large scale flow structures in the wake. For example, the flow control device may be arranged to suppress vortex shedding downstream of the flow-facing element.

Typically, the flow control device is a passive flow control device. A passive flow control device may be optimised to provide the desired flow control in a particular phase of flight. For example the flow control device may be optimised to provide the maximum noise reduction in flow conditions that would occur during approach and landing.

Splitter plates (alternatively referred to as "split plates") are a known means of aerodynamic flow control and have been primarily used to modify the separated wake behind cylinders.

Splitter plates generally extend from centre-line of the downstream face of the cylinder.

The splitter plate according to embodiments of the invention may be substantially aligned with the free stream airflow and may extend in a substantially radial direction with respect to the structural element.

In some embodiments the splitter plate may comprise a rigid plate.

The pneumatic splitter plate may comprise an array of nozzles, for example a series of holes and/or slots. The array may comprise a plurality of holes and/or slots which are substantially aligned along the centre line of the structural element. The array may comprise a plurality of holes and/or slots which are distributed along the length of the flow-facing element.

The flow-facing element may be an aircraft structural element. For example the flow-facing element may be a strut.

According to a second aspect of the invention there is provided an aircraft noise-reduction apparatus, the apparatus comprising a fairing, for locating upstream of a structural element such that, in use, airflow is at least partially diverted away from the structural element, and a splitter plate provided in the cavity defined between the fairing and the structural element and arranged, in use, to reduce noise induced by unsteady flow downstream of the fairing. Such an arrangement may help reduce self-noise which may otherwise be produced by the fairing.

Where the flow-facing element is a fairing, the flow control device may be arranged to reduce recirculating flow between the fairing and the structural element.

In some embodiments a splitter plate may be arranged such that it is also adapted to secure the fairing to the structural member.

In alternate embodiments the flow control device may comprises a pneumatic splitter plate arranged to provide a jet of air between a fairing and structural member.

The structural element may comprise a component of an aircraft landing gear.

A further aspect of the invention comprises an aircraft landing gear comprising a noise reduction apparatus according to an embodiment of the first aspect of the invention.

BRIEF DESCRIPTION OF THE DRAWINGS

Embodiments of the present invention will now be described by way of example only with reference to the accompanying schematic drawings in which.

DETAILED DESCRIPTION OF AN EMBODIMENT

Figure 1:
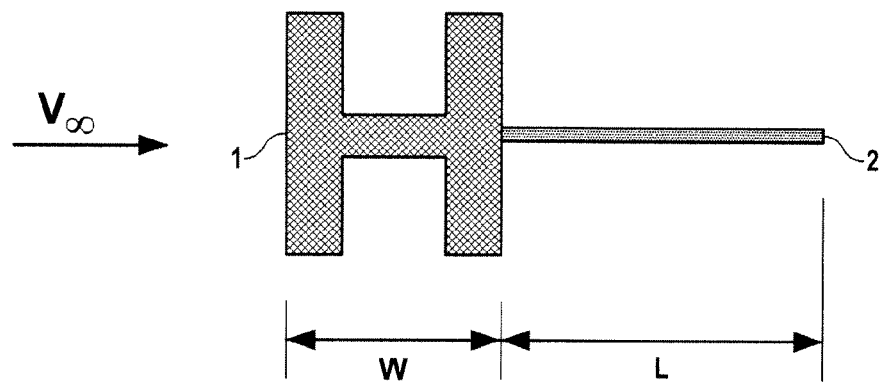
FIG. 1 schematically illustrates, in plan view, a noise reduction apparatus which utilises a rigid splitter plate.

FIG. 1 shows a noise reduction apparatus. The noise reduction apparatus comprises a structural element 1 which is exposed, in use, to an airflow $V_{28}$. In other words, the structural element is flow-facing. $V_\infty$ may be assumed to be the free stream airflow. In the case where the structural element 1 is a landing gear component it will be appreciated that it may be deployable, such that it is only be exposed to the airflow $V_\infty$ during take-off, landing and approach.

The structural element 1 is a bluff body, in this case a H-Beam. The skilled person will appreciate that a bluff body may be generally characterised as any body where there is significant flow separation and a generally unsteady wake.

The noise reduction apparatus further comprises a flow control device in the form of a splitter plate 2. The splitter plate 2 is a rigid plate attached to the downstream side of the structural element 1. The splitter plate 2 extends perpendicularly from the downstream surface of the structural element 1 and is located on the centre line of the element.

The splitter plate 2 is arranged such that it is substantially aligned with the free stream flow $V_\infty$. When mounted on an aircraft it may be convenient to simply align the splitter plate 2 with the longitudinal axis of the aircraft, since this is a reasonable approximation to the free stream airflow during approach and landing.

Preliminary experiments were carried out to evaluate the effectiveness of this embodiment of the invention. A H-beam was tested as it is considered a good example of a simple bluff-body which produces noise over a broad range of frequency spectrum. A splitter plate 2 having a length L, measured in the streamwise direction, was attached to the rear of the element 1 having a length W. A selection of different splitter plate lengths (L/W=1, L/W=2 and L/W=3), and a body without a splitter plate, were tested.

A comparison of flow visualisations with and without the presence of the splitter plate showed that the presence of the splitter plate blocked interaction between shear layers in the vicinity of the body. The shear layers continued to converge downstream leading to a longer and wider wake.

The Coefficient of Drag for each arrangement was also compared. The addition of the L/W=1 splitter plate resulted in a drop in the coefficient of drag of $C_d$=0.47. Increasing the length of the splitter plate reduced the drag further by $C_d$=0.23 between L=W=1 and L=W=3.

Standard deviations of velocity plots were used to compare the unsteady flow. The unsteadiness was concentrated around the H-beam with the highest velocity fluctuation just aft of it. In the L/W=1 configuration the unsteadiness moved further downstream and away from the model.

The narrowband spectra were measured in an anechoic chamber and plots compared for the different configurations to show how the noise signature of the model was affected. The L/W=0 case showed a strong tonal peak at a Stroudal Number (based upon the width of the body) of 0.125 and broadband noise "hump" cantered about a Stroudal Number of 0.75. In the cases of L/W=1, L/W=2 and L/W=3 the tonal peak was suppressed and the noise was reduced over the whole frequency range. The splitter plate configurations showed very similar noise spectra up to a Stroudal Number of 17.5. Above that frequency the L=W=2 configuration showed marginally lower noise levels.

Source localization plots were used to identify where origin of the noise reduction. The comparison between the plots showed that the H-Beam is no longer the main noise source when the splitter plate is used. Rather, the noise source is located towards the trailing edge of the splitter plate.

Figure 2A:
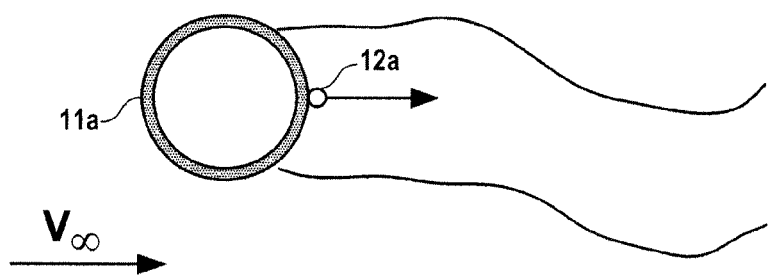
FIGS. 2A and 2B schematically illustrate, in plan view, noise reduction apparatus in accordance with alternate embodiments of the invention which utilise a pneumatic splitter plate.
Figure 2B:
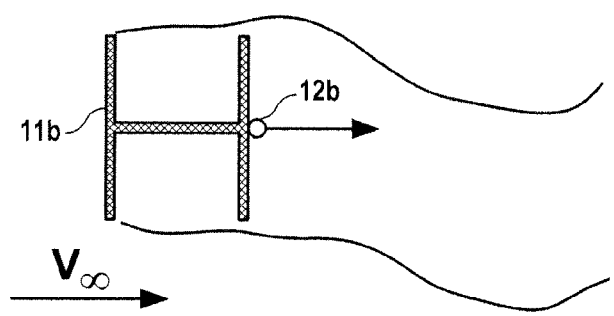

FIGS. 2A and 2B show the use of a pneumatic splitter plate for downstream flow control. FIG. 2A illustrates a cylinder bluff body 11a as a flow-facing element. FIG. 2B shows a H-Beam 11b flow-facing element. In each case a pneumatic splitter plate is provided by means of a blowing device 12a, 12b on the downstream face of the respective element 11a, 11b. As with the rigid splitter plate 2 of FIG. 1, the pneumatic splitter plate is located on the centre line of the element.

Figure 3A:
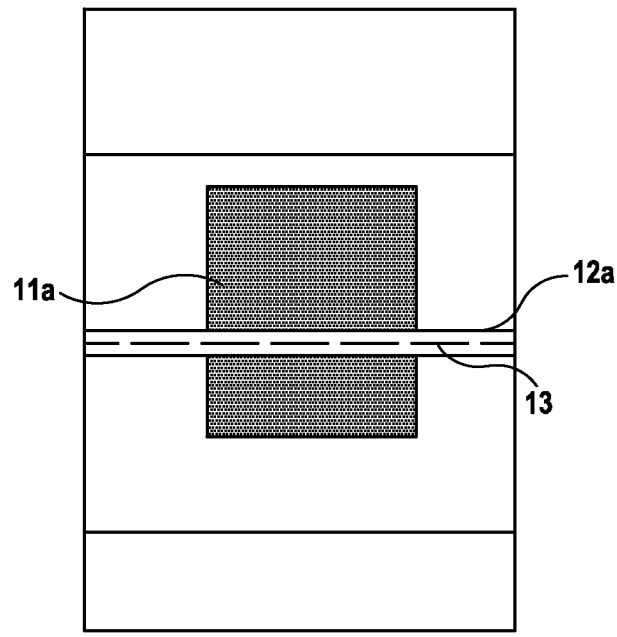
FIGS. 3A and 3B show the pneumatic splitter plate used in the noise reduction apparatus of FIGS. 2A and 2B.
Figure 3B:

As shown in FIGS. 3A and 3B, the blowing device 12a and 12b simply comprises a pipe attached to the rear of the element 11a, 11b with a series of nozzles in form of simple holes 14 or slots 13. The holes 14 or slots 13 are distributed along length of the pipe (and therefore, along the length of the element 11a, 11b) to form an array. Pressurised air is provided to the pipe to provide blowing from the nozzles in the form of a relatively small jet downstream.

In preliminary experiments carried out to evaluate the effectiveness of this second embodiment of the invention, the pneumatic splitter plate was found to provide the same flow effects as a physical split plate. For example the pneumatic splitter plate delays the roll-up of vortices behind the element 11a, 11b and interrupts the interaction of shear layers. The noise reduction effect of the pneumatic splitter plate was also equivalent to that of the rigid plate. Only a relatively small blowing rate was required to provide the equivalent effect of the L/W=1 splitter plate arrangement of the first embodiment.

Figure 4:
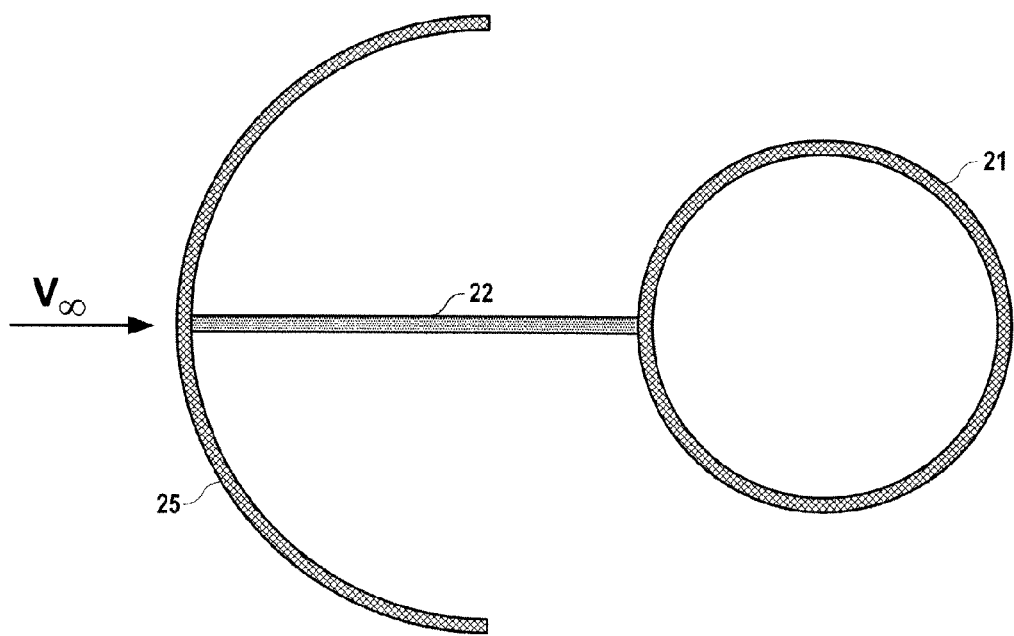
FIG. 4 schematically illustrates, in plan view, a noise reduction apparatus in accordance with an embodiment of the invention which utilises a noise reduction fairing and splitter plate.

FIG. 4 shows a further embodiment of the invention in which the flow-facing component is a fairing 25, positioned upstream of a structural element 21 and arranged to at least partially divert the free stream airflow $V_\infty$ away from the element 21. Such fairings have been proposed for noise reduction purposes. However, the applicants have recognized that in some circumstances the noise-reduction fairing 25 may itself contribute to the total broadband noise of the aircraft. Thus, according to embodiments of the invention a splitter plate 22 is provided in the cavity defined between the fairing 25 and the element 21. The splitter plate 22 may conveniently be arranged to support the fairing 25 from the structural element 21.

The splitter plate 22 reduces or eliminates vortex shedding from the fairing 25 and in turn reduces noise. As with the previous embodiments this is due to the splitter plate 22 blocking the interaction between opposing shear layers. The splitter plate 22 also reduced the interaction between the shear layers and the downstream element 21.

Figure 6:
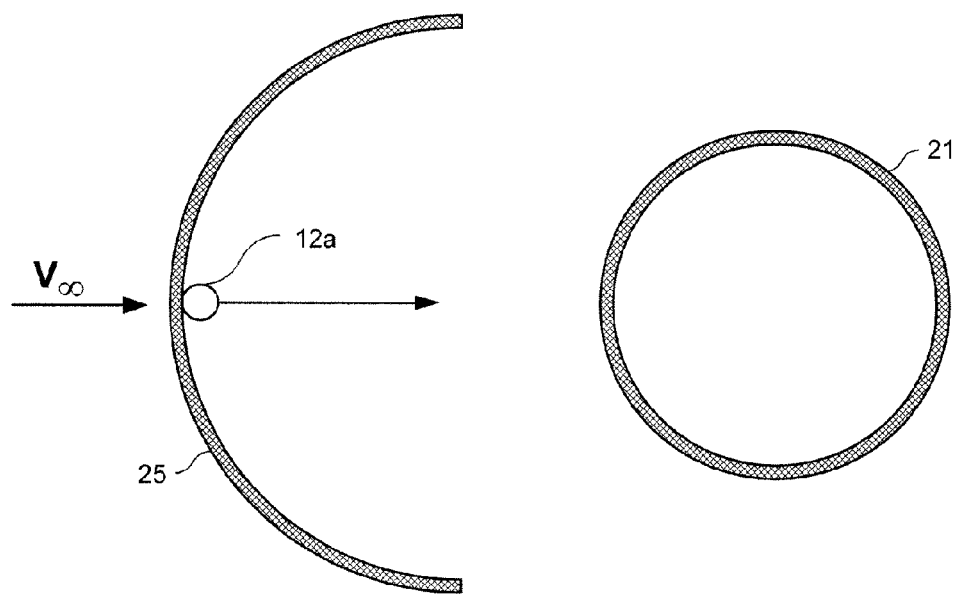
FIG. 6 schematically illustrates, in plan view, a noise reduction apparatus in accordance with an embodiment of the invention which utilises a noise reduction fairing and pneumatic splitter plate.

It will be appreciated that the rigid splitter plate 22 may alternatively be replaced by a pneumatic splitter plate (as described above) attached to the downstream side of the fairing 25 as shown in FIG. 6.

Preliminary experiments were carried out to evaluate the effectiveness of this further embodiment of the invention. Three different sizes of elements 21 were used to investigate the possibility of reducing the size of the fairing 25 with respect to the element 21. Aerodynamic and acoustic results were performed in wind tunnel and anechoic facilities.

In the configurations without the splitter plate 22 a recirculating region of flow was observed in the cavity between the fairing 25 and the element 21 as the shear layer aft of the fairings' trailing edge impinged on the element part, rolling up inside the cavity. The element 21 was subjected to relatively high-speed flow due to the shear layer interaction.

The application of the splitter plate for the two smaller elements 21 blocked the interaction between the opposing shear layers and inhibited the shear layer from interacting with the element. As a result the recirculating flow inside the cavity was reduced considerably. The larger element 21 was large enough for the shear layer to impinge on it, nevertheless the splitter plate 22 impeded the strong recirculation flow within the cavity. Instead a low velocity wake was observed aft of the element 21. The effect of this change in flow structure had an impact on the noise produced. The source strength around the apparatus was significantly reduced as the magnitude of the velocities and the unsteadiness around the fairing 25 and the element 21 were lower, hence reducing the dipole strength attributed with the fluctuating lift forces on the apparatus. The strong shedding produced a strong tonal peak in the noise measurements, increasing the overall noise signature. The splitter plate reduced or totally eliminated this tone. The configurations involving the two smaller elements 21 reduced this tonal peak by about 14 dB, measured from the ⅓-octave band spectra. The larger element eliminated the tonal peak completely although a second smaller tonal peak was observed at a high frequency.

Figure 5:
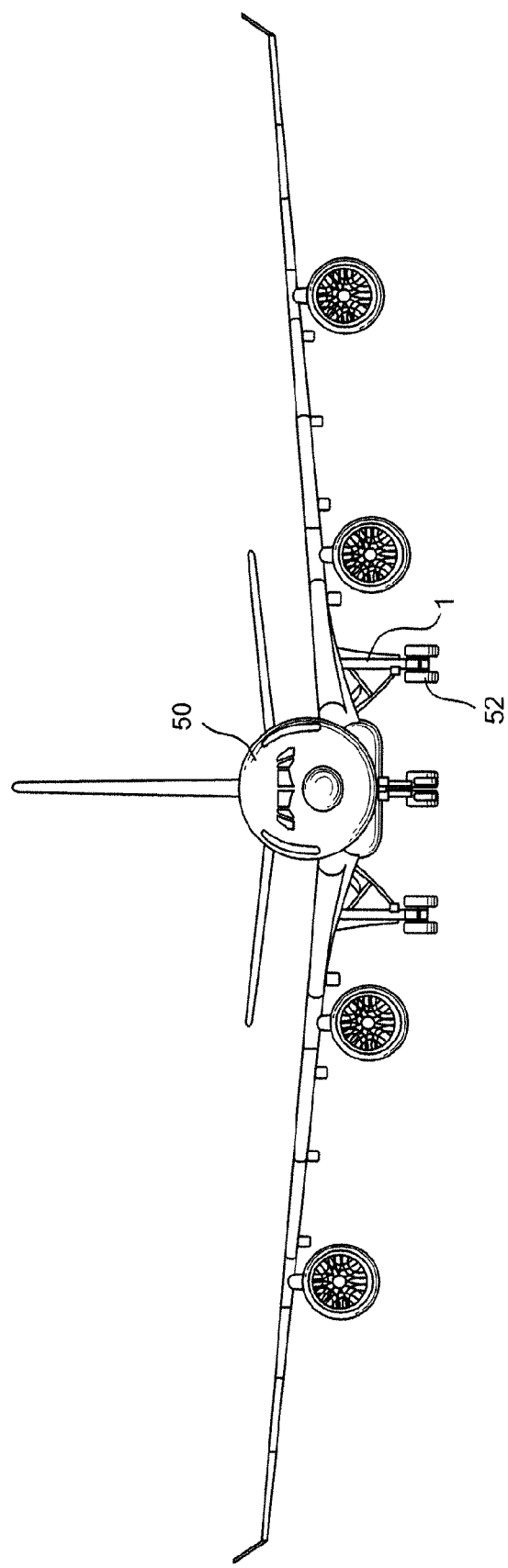
FIG. 5 illustrates in front view a generic commercial aircraft with landing gear extended.

FIG. 5 shows a generic commercial aircraft 50 with an extended landing gear 52 including a structural element 1.

The skilled person will appreciate that any of the embodiments of the invention may be applied to aircraft components as required and may be particularly beneficial when applied to aircraft landing gear. It may further be appreciated that different embodiments of the invention may be preferred dependent on the particular application and its associated design constraints. For example, in some applications the rigid splitter plate may be preferred due to its simplicity whereas in other applications the pneumatic splitter since it may offer space and/or weight savings while offering the same functionality.

Although the invention has been described above with reference to one or more preferred embodiments, it will be appreciated that various changes or modifications may be made without departing from the scope of the invention as defined in the appended claims.

For example, it will be appreciated that any of the embodiments of the invention may be tuned for a particular application. For example the dimensions of a rigid splitter plate or the nozzle size, position and air-pressure of a pneumatic splitter plate may be optimised. Such optimisation may take into account a number of design factors, for example, the level of noise reduction, the aerodynamic benefit (or penalty), weight and/or space constraints may be considered.

The skilled person will appreciate that the blowing effect of a pneumatic splitter plate could be variable in use to provide an active flow control device. Equally a rigid plate could be partially or fully deployable to provide an active flow control device. Equally, similar effects could be used to provide a noise control system which is only activated when required (for example during approach and landing but not during take-off, when engine noise is dominant)

The skilled person will also appreciated that the blowing device used in the pneumatic splitter plate embodiment is not limited to an external pipe arrangement such as those shown in FIGS. 2 and 3. For example the device may be formed from a pipe embedded in the structure or may blow air from an internal plenum chamber.

The invention claimed is:

1. An aircraft noise-reduction apparatus, the apparatus comprising:
   an aircraft structural element of an aircraft landing gear, wherein the aircraft structural element forms a bluff body; and
   a flow control device positioned downstream of the structural element and attached to a downstream side of the structural element, wherein the flow control device is configured to reduce noise induced by unsteady flow downstream of the structural element, wherein the flow control device is comprised of a pneumatic splitter plate.

2. The aircraft noise reduction apparatus of claim 1, wherein the pneumatic splitter plate comprises an array of nozzles.

3. The aircraft noise reduction apparatus of claim 1, wherein, the pneumatic splitter plate comprises a plurality of at least one of holes and slots which are substantially aligned along a center line of the structural element.

4. An aircraft noise-reduction apparatus, the apparatus comprising:
   a fairing located upstream of a structural element and configured to at least partially divert airflow away from the structural element; and
   a splitter plate provided in a cavity defined between the fairing and the structural element, wherein the splitter plate is attached to a downstream surface of the fairing and to an upstream surface of the structural element, wherein the splitter plate is configured to reduce noise induced by unsteady flow downstream of the fairing, wherein the splitter plate is adjacent a downstream side of the fairing and is entirely upstream of the structural element.

5. The aircraft noise reduction apparatus of claim 4, wherein the splitter plate is arranged to reduce recirculating flow between the fairing and the structural element of the landing gear.

6. The aircraft noise reduction apparatus of claim 4, wherein the splitter plate is adapted to secure the fairing to the structural member.

7. The aircraft noise reduction apparatus of claim 4, wherein splitter plate comprises a pneumatic splitter plate.

8. The aircraft noise reduction apparatus of claim 4, wherein the splitter plate comprises a plate adjacent the downstream side of the fairing, arranged parallel to a centerline of the fairing and extending in a downstream direction from the fairing.

9. The aircraft noise reduction apparatus of claim 4, wherein the structural element comprises a component of an aircraft landing gear.

10. A landing gear for an aircraft comprising a noise reduction apparatus according to claim 4.

11. A landing gear for an aircraft comprising:
    a bluff body component of the aircraft landing gear wherein the bluff body component is a structural element of the landing gear, and a pneumatic splitter plate is attached to a downstream side of the bluff body component and extends in a downstream direction from the bluff body component, wherein the pneumatic splitter plate is configured to blow a fluid in the downstream direction.

12. The landing gear of claim 11 wherein the pneumatic splitter plate is aligned along the downstream direction with a centerline of the bluff body component.

* * * * *